United States Patent
Maybee et al.

(10) Patent No.: US 7,665,093 B2
(45) Date of Patent: Feb. 16, 2010

(54) SYNCHRONIZATION OF RUNTIME AND APPLICATION STATE VIA BATCHING OF WORKFLOW TRANSACTIONS

(75) Inventors: Paul E. Maybee, Seattle, WA (US); Anandhi Somasekaran, Redmond, WA (US); Satish R. Thatte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/023,769

(22) Filed: Dec. 22, 2004

(65) Prior Publication Data

US 2006/0136279 A1    Jun. 22, 2006

(51) Int. Cl.
*G06F 9/46* (2006.01)
*G06F 7/00* (2006.01)
*G06F 15/16* (2006.01)

(52) U.S. Cl. .......... 718/106; 718/101; 707/10; 707/101; 707/102; 709/201; 709/204; 705/8; 705/9

(58) Field of Classification Search ........... 718/104, 718/105, 101, 106; 709/201, 204; 707/10, 707/101, 102; 705/8, 9
See application file for complete search history.

(56) References Cited

U.S. PATENT DOCUMENTS

| | | | |
|---|---|---|---|
| 5,774,661 A | 6/1998 | Chatterjee et al. | |
| 5,960,404 A * | 9/1999 | Chaar et al. | 705/8 |
| 6,115,646 A | 9/2000 | Fiszman et al. | |
| 6,225,998 B1 | 5/2001 | Okita et al. | |
| 6,253,369 B1 | 6/2001 | Cloud et al. | |
| 6,609,128 B1 * | 8/2003 | Underwood | 707/10 |
| 6,625,602 B1 * | 9/2003 | Meredith et al. | 707/8 |
| 6,907,451 B1 * | 6/2005 | Mukundan et al. | 709/204 |
| 7,127,716 B2 * | 10/2006 | Jin et al. | 718/105 |
| 7,289,964 B1 * | 10/2007 | Bowman-Amuah | 705/1 |
| 7,451,432 B2 * | 11/2008 | Shukla et al. | 717/106 |
| 7,461,119 B2 * | 12/2008 | Mukundan et al. | 709/203 |

(Continued)

FOREIGN PATENT DOCUMENTS

EP    0953929 A1    11/1999

(Continued)

OTHER PUBLICATIONS

Rusinkiewicz et al., "Specification ABD Execution of Transactional Workflows", University of Houston, 1994, pp. 1-20.*

(Continued)

*Primary Examiner*—Meng-Ai An
*Assistant Examiner*—Jennifer N To
(74) *Attorney, Agent, or Firm*—Senniger Powers LLP

(57) ABSTRACT

Workflow management for maintaining consistency of persisted state across communicating components via batching of uncommitted work. A workflow component defines a workflow containing work items to be performed by service provider components. The workflow component assigns the work items to the service provider components, and the service provider components acknowledge the assigned work items. The workflow component appends the assigned work items to a work batch. The workflow component creates a transaction containing the batched work items. The workflow component commits to the workflow by requesting the service provider components to perform the work items. The workflow component checks the state of the execution of the work items and stores the state in a persistent storage.

16 Claims, 5 Drawing Sheets

U.S. PATENT DOCUMENTS

| | | |
|---|---|---|
| 2002/0040312 A1 | 4/2002 | Dhar et al. |
| 2002/0184610 A1 | 12/2002 | Chong et al. |
| 2003/0135659 A1 | 7/2003 | Bellotti et al. |
| 2003/0220707 A1 | 11/2003 | Budinger et al. |
| 2004/0078105 A1 | 4/2004 | Moon et al. |
| 2004/0078373 A1 | 4/2004 | Ghoneimy et al. |
| 2004/0148213 A1 | 7/2004 | Aziz et al. |
| 2004/0162741 A1 | 8/2004 | Flaxer et al. |

FOREIGN PATENT DOCUMENTS

| | | |
|---|---|---|
| WO | 0054202 A | 9/2000 |

OTHER PUBLICATIONS

Abhay Parasnis, Session Code: DAT321—Datay Systems—BizTalk Orchestration Engine Futures, Microsoft Professional Developers Conference 2003, Online!, Oct. 27, 2003-Oct. 30, 2003, pp. 1-26, XP002360567, Los Angles, CA, USA http://only4gurus.com/v3/downloadcount.asp?id=421>, retrieved on Dec. 21, 2005.

Marshak R T, IBM's Flowmark Object-Oriented Workflow for Mission-Critical Applications, Workgroup Computing Report, May 1, 1994, pp. 3-13, vol. 17, No. 5, XP00056899, ISSN: 1057-8889.

Maurer, Frank et al., Merging Project Planning and Web-Enabled Dynamic Workflow Technologies, IEEE Internet Computing, Jun. 2000, pp. 65-74, XP002345613, ISSN: 1089-7801, IEEE Service Center, Piscataway, NJ, US.

Blake, "Coordinating Multiple Agents for Workflow-oriented Process Orchestration," Springer-Verlag, 2003, pp. 387-404.

Virdel, "Business Processes and Workflow in the Web Services World," printed from http://www-106.ibm.com/developerworks/webservices/library/ws-work.html, Jan. 2003, 5 pages, USA.

Boiko, "Everyone Talks About Workflow, But What Is It, Really?," printed from http://www.cmswatch.com/Features/TopicWatch/FeaturedTopic/?feature_id=47, Oct. 4, 2001, 5 pages, USA.

Adkins, "Introduction to Workflow Learning," printed from http://www.internettime.com/workflow/intro_wfl.htm, 2003, 11 pages, USA.

Unknown, The Workflow Engine Model, printed from http://msdn.microsoft.com/library/default.asp?url=/library/en-us/modcore/html/decontheworkflowenginemodel.asp, 2001, 2 pages, USA.

\* cited by examiner

SYNCHRONIZATION OF RUNTIME AND APPLICATION STATE VIA BATCHING OF WORKFLOW TRANSACTIONS

TECHNICAL FIELD

Embodiments of the present invention relate generally to the field of workflow modeling. In particular, embodiments of this invention relate to maintaining consistency of persisted state across communicating components via batching of uncommitted work.

BACKGROUND OF THE INVENTION

Existing software systems attempt to map business problems to high-level workflows by modeling the business problem. In general, the workflow process involves a series of tasks or actions, the order in which they must be performed, permissions defining who can perform them, and script that is executed for each action. Workflow may also be described in terms of states and events. A workflow engine, which may be a component of a software system that enables workflow, enforces the workflow definition and executes workflow actions.

The workflow engine has three main functions. First, it verifies whether a change is valid for the current workflow state. Second, it checks if the current user has permission to execute the workflow event. Third, if the event is valid and the user has permission to execute the event, the workflow engine permits execution. For example, in managing a series of tasks, such as those involved in publishing a news article, a series of work items must be performed. In this example, tasks include writing the article, editing the written article, reviewing the edited article, and publishing the edited article. A typical workflow engine may request that different service provider components (e.g., Write component, Edit component, Review component, and Publish component) perform these work items or tasks.

The workflow engine/component of a software system regularly communicates with other components (e.g., Write component, Edit Component, or the like) to monitor the states of the various work items. At the same time, these components may also monitor or checkpoint the states of these work items. Unfortunately, these components have no mechanism for keeping their persisted states consistent.

For example, the workflow engine may call different components to execute a number of work items during execution of a workflow. The workflow engine may send several messages to these components to determine the states of the work items. Each message that is sent invokes a messaging service provider component. Because the messaging component is required to maintain consistent and durable state with respect to the workflow, messages should not be sent out unless the workflow states can be successfully persisted.

Unfortunately, this type of vertically integrated software system design approach (i.e., execution of work items substantially upon arrival of data) has many shortcomings. For example, while one component is performing a particular task or work item, other components may not know the state of that particular work item (e.g., completed, executing, or abandoned). In addition, when there is a failure in executing one or more work items in a workflow to be performed, the workflow engine may be required to re-execute the entire workflow due to a lack of state knowledge.

Accordingly, improvements in workflow management for synchronizing runtime and application state of work items via a mechanism for batching of workflow transactions and for enabling the workflow engine, through batching of transactions, to delay execution of work items and to maintain consistency of persisted state of work items across communicating components are desired to address one or more of these and other disadvantages.

SUMMARY OF THE INVENTION

Embodiments of the present invention facilitate components sharing in the persistence transaction. In other words, these embodiments permit committing workflow states and the outstanding messaging states to persistent storage in a single transaction, which ensures that "checkpointed" states are consistent across all components. Embodiments of the present invention include a workflow component that floats a work batch object in the thread call context in all of its calls or assignments to service provider components. The service provider components can choose to add work to this batch, which at commit time would treat all actions as a single transaction.

In accordance with one aspect, a method manages state in a workflow. One or more work items to be executed are defined. The one or more defined work items are assigned to one or more service provider components for execution. The one or more assigned work items are batched to the one or more service provider components at a later time. A state of the one or more batched work items is persisted. The one or more service provider components commit to execute the one or more batched work items when the one or more service provider components execute the one or more committed work items.

According to another aspect, one or more computer-readable media have computer-executable components for managing state in a workflow. A workflow component assigns one or more work items to be executed. The workflow component defines the one or more work items and the workflow component batches one or more assigned work items at a later time. One or more service provider components commit to execute the one or more batched work items.

In accordance with yet another aspect, a system maintains persistent states of services. A workflow engine assigns one or more work items to be executed. The workflow engine defines the one or more work items, and the workflow batches one or more assigned work items at a later time. A service provider component commits to execute the one or more assigned work items.

In a further aspect, a method manages workflow of one or more work items executable by a first host environment. An assignment to execute one or more work items is received at the first host environment. The one or more assigned work items are appended to a batch at the first host environment, indicating that the one or more assigned work items are to be executed by the first host environment at a later time. A request to execute the one or more assigned work items is received at the first host environment. The first host environment executes the one or more requested work items.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
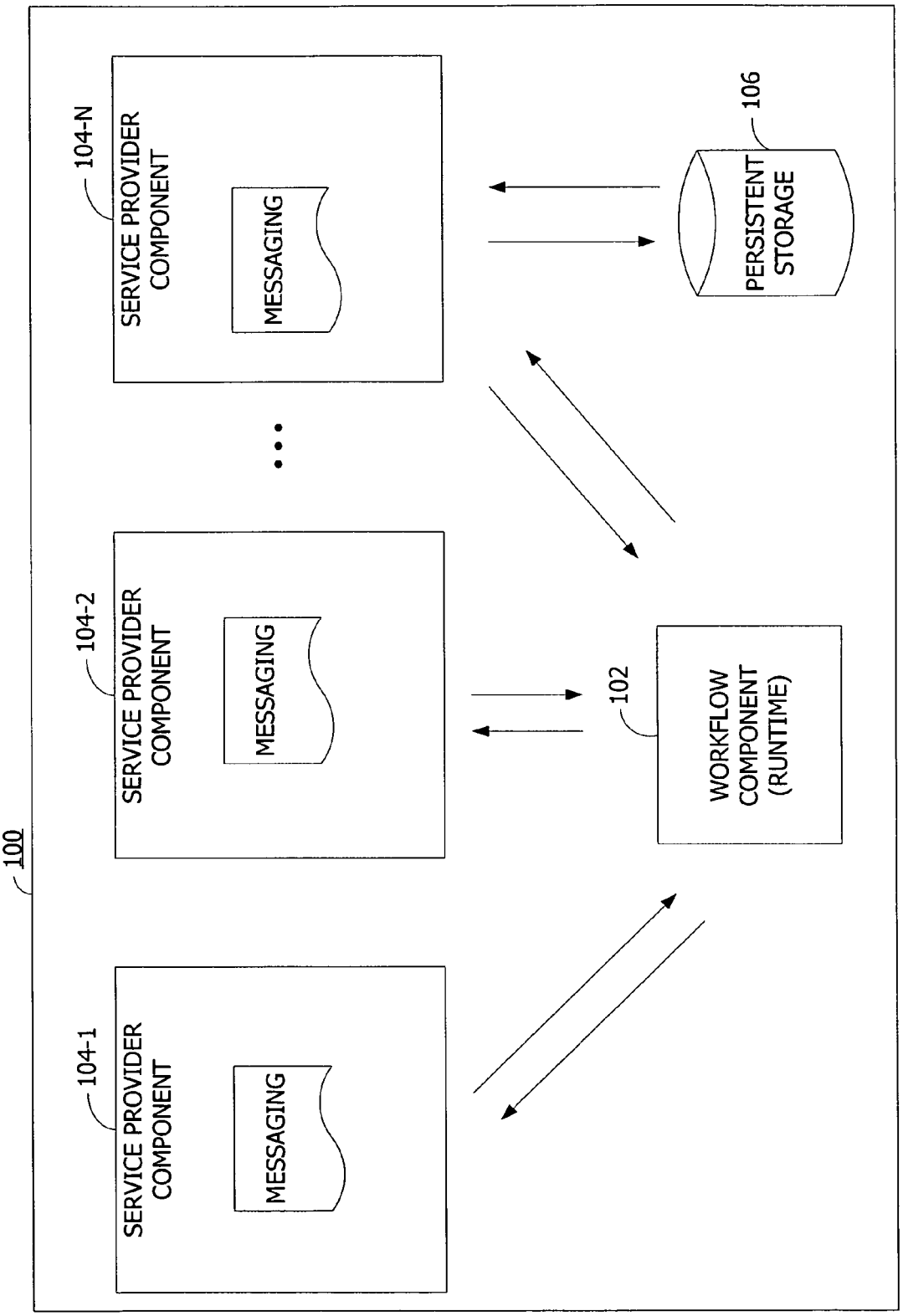
FIG. 1 is an exemplary embodiment of a block diagram illustrating a system for maintaining consistency of persisted state across communicating components via batching of uncommitted work according to an embodiment of the invention.

Referring first to FIG. 1, a block diagram illustrates a system 100 for maintaining consistency of persisted state across communicating components via batching of uncommitted work according to an embodiment of the invention. The system 100 includes, but is not limited to, a workflow component 102, one or more service provider components 104, and a persistent storage 106. In one embodiment, the system 100 is a software system comprising one or more components (e.g., workflow component 102, service provider component 104, or the like). In another embodiment, the system 100 is an integrated software application system comprising one or more applications and/or software systems that include embodiments of the invention, such as an enterprise application integration system.

The workflow component 102 manages work in the form of tasks performed by service provider components 104 (e.g., 104-1 to 104-N).

The service provider components 104-1 to 104-N in FIG. 1 are components that provide various services or work items. For example, service provider component 104-1 may be a component that provides a web service such as receiving a user search query, receiving an online order of a product, or the like. In one embodiment, service provider components 104 are part of the system 100, also known as a host environment, and service provider components 104 are hosts. In another embodiment, some or all of service provider components 104 are outside of the system 100. For example, service provider component 104-1 may be in a separate software application or system from that of service provider component 104-2. In yet another embodiment, examples of work items performed by service provider components 104 may include, but not limited to, messaging, instance, transaction, persistence, threading, timer, roles, tracking, or the like.

While workflow component 102 and service provider components 104 as illustrated in FIG. 1 are part of the system 100, it is to be understood that these components (i.e. workflow component 102, service provider components 104, and/or persistent storage 106) may be part of separate systems (e.g., separate host environments). For example, workflow component 102 may be in a stand-alone software application while service provider component 104-1 and/or service provider component 104-2 may be in a separate software, such as a word processing software, a spreadsheet software, or the like.

Initially, workflow component 102 has a series of work items for execution. For example, in a system providing web services, a series of work items may be required for composing a new web page for selling a new product. The work items or tasks include, but are not limited to, providing a picture of the product, providing a description of the product, searching for the product availability, or the like. In this example, service provider components 104-1 to 104-N provide services that perform or execute all or part of these work items. As shown in FIG. 1, service provider components 104 may also interact with persistent storage 106 rather than solely with workflow component 102 directly.

Given this series of work items, workflow component 102 first defines the execution of these work items. In the above example of composing a new web page, workflow component 102 defines the sequence of execution of work items, such as providing a picture of the product before providing a description of the product, and so on. In addition, workflow component 102 defines other rules, such as deadlines and/or other business rules. For example, workflow component 102 may impose a deadline for completion of the composing of the new page and/or a discount for the first two days when the new product is available for online customers, and the like. It is to be understood that other rules and/or definitions for execution of work items may be provided to workflow component 102.

Figure 2:
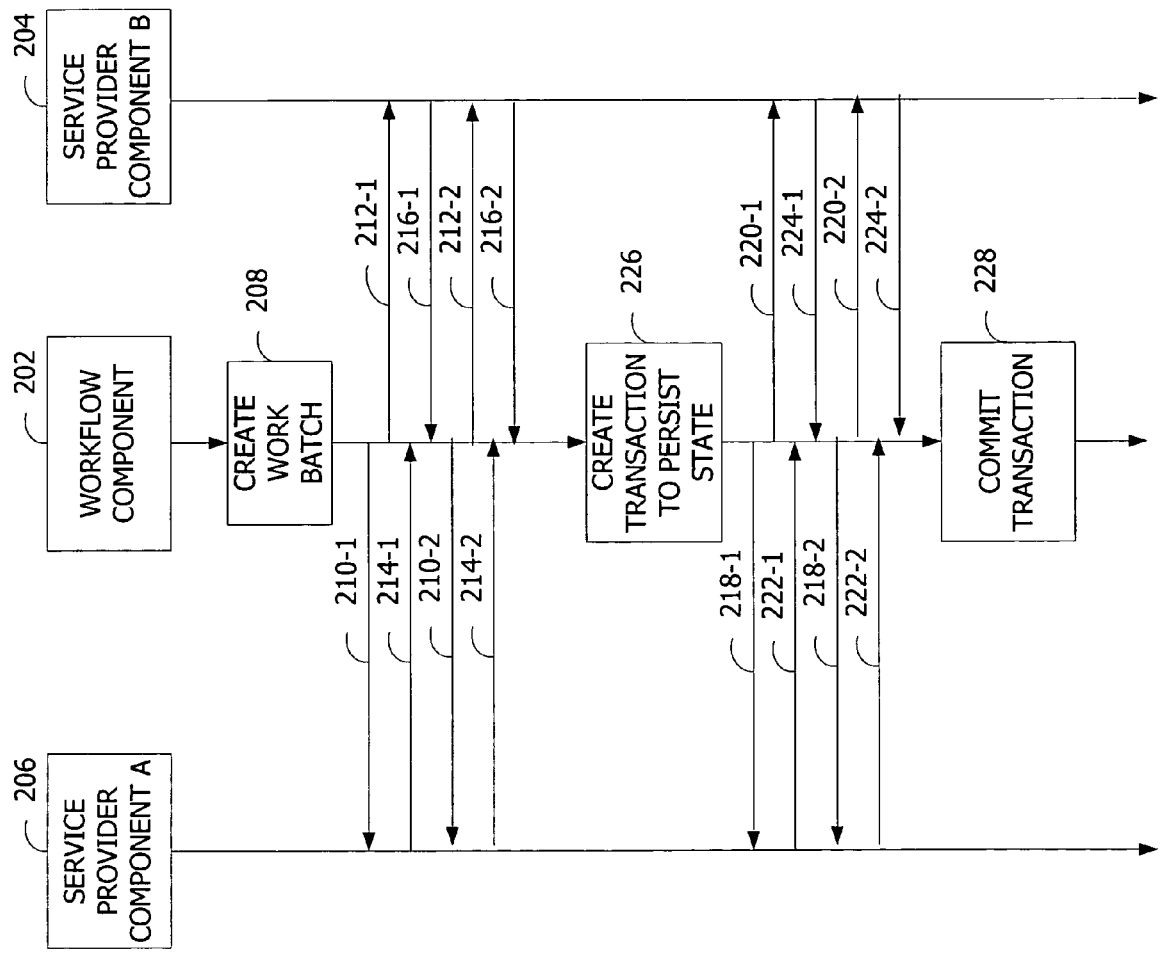
FIG. 2 is an exemplary flow diagram illustrating batching of work items from service provider components according to an embodiment of the invention.

Once these series of work items are defined, workflow component 102 assigns these work items to one or more service provider components 104. Referring now to FIG. 2, a flow diagram illustrates batching of work items from service provider components 104 according to an embodiment of the invention. For example, before invoking a service provider component, workflow component 102 creates a work batch at 208 for a series of work items. At 210-1, workflow component 102 assigns a work item (e.g., providing a picture of the new product) by sending a message to the service provider component A (e.g., service provider component 104-1). In other words, workflow component 102 attaches the batch to the invocation of an operation on the service provider component A. In turn, the service provider component A creates a first work item and appends it to the work batch. Similarly, workflow component 102 assigns another work (e.g., providing a description of the new product) to a service provider component B (e.g., service provider component 104-2) via 212-1. In one embodiment, workflow component 102 assigns the work items to the service provider component A by requesting the service provider component A to delay execution of the work items. For example, workflow component 102 requests the service provider component A to perform a work item until workflow component 102 instructs the service provider component A to perform. In another embodiment, workflow component 102 may create one or more work batches, each of which contains a series of work items to be performed by various service provider components 104.

It is to be understood that workflow component 102 may request service provider component A to perform a work item and service provider component A appends one aspect of the assigned work item to the work batch, rather than the entire work item. For example, a work item appended to the work batch by service provider component A may be the database element of a request from workflow component 102. In another example, a work item appended to the work batch by service provider component B may be a different aspect of the same request from workflow component 102.

It is also to be understood that multiple interactions between workflow component 102 and each service provider component (e.g., service provider component A) may take place. For example, workflow component 102 may assign more than one work items to service provider component A via 210-2 (or to service provider component B via 212-2), and service provider component A appends the one or more assigned work items to the work batch via 214-2 (or service provider component B appends the one or more assigned work items to the work batch 216-2).

In another embodiment, workflow component 102 creates a work batch associating with work items assigned to a particular service provider component. For example, workflow component 102 may create a work batch for work items from service provider component A and another work batch for work items from service provider component B. As such, workflow component 102 creates work batches for each service provider component as needed.

The service provider component A responds to workflow component 102 via 214-1 by appending or adding the assigned work item to the work batch. Similarly, the service provider component B appends the work item to the work batch via 216-1. For example, using the example above, service provider component 104-1 sends a message to workflow component 102 that it is able to provide a picture of the new product for composing the new web page. Similarly, service provider component 104-2 sends a message to workflow component 102 that it is able to provide a description of the new product. It is contemplated that workflow component 102 may not know the details of how a particular service provider component 104 executes a particular work item. Using the above example of composing a new web page for a new product, service provider component 104-1 may be required to access a database containing numerous product pictures to locate the picture of the new product. Similarly, service provider component 104-2 may be required to access a database containing descriptions of products and/or may be required to have a human intervention to provide a new description if not available in the database.

Although only two service provider components A and B are shown in FIG. 2, it is to be understood that additional work items may be assigned to these and other service provider components. It is also to be understood that service provider components 104 may decline to perform the assigned work items from workflow component 102.

Upon receiving messages from service provider components 104, workflow component 102 creates a transaction containing the batched work items for persisting the state of the work items at 226. For example, workflow component 102 may create a transaction at a scheduled point or time. At 218-1, workflow component 102 requests the service provider component A to persist the batched work item (e.g., providing a picture of the new product). In other words, workflow component 102 requests the service provider component A as to the state of execution of the batched work item. The service provider component A at 222-1 responds to workflow component 102 by indicating a state of the batched work item, such as "not executed", "completed", "executing", "abandoned", or the like. It is to be understood that one or more other state that corresponds to the particular work item may be provided to workflow component 102. Similarly, workflow component 102 requests service provider component B (e.g., service provider component 104-2) to persist the state of execution of the batched work item (e.g., providing a description of the new product) at 220-1, and the service provider component B responds to the request at 224-1.

It is also to be understood that workflow component 102 may send multiple requests (e.g., 218-2) to service provider component A as to the state of execution of another batched work item. Likewise, service provider component A may respond to workflow component 102 (e.g., at 222-2) to indicate the state of the another requested batched work item.

According to one embodiment of the invention, workflow component 102 creates a transaction to persist states. The workflow component 102 iterates over the work batch and collects all of the work items for service provider component A. In this instance, workflow component 102 maintains order among the work items to create a specific work batch. At a commit point, workflow component 102 passes the transaction and work batch when it invokes the operation of service provider component A. The service component A adds the work items in the work batch to the transaction. In other words, the work items are persisted. These processes may be repeated for all components with items in the work batch. Upon success of the commit notifications or messages, workflow component 102 commits the transaction. Then, upon successful commit of the transaction, workflow component 102 iterates over the batch and collects all work items per component (as before with respect to service provider component A).

The workflow component 102 next stores the states of the work items in persistent storage 106 provided by service provider components 104. For example, service provider components 104 provide their entire resource environments, such as persistent storage 106, for workflow component 102 to store the states of work items. Similarly, the interaction (e.g., arrows between service provider component 104-N and persistent storage 106 in FIG. 1) is an example showing that service provider component 104-N accessing persistent storage 106 for workflow component 102 to store the state of work items. It is also to be understood that, although only one persistent storage 106 is shown in FIG. 1, multiple persistent storages may be available to workflow component 106 to store the states of work items. Persistent storage 106 may be a volatile and nonvolatile, removable and non-removable media for storage of information such as computer readable instructions, data structures, program modules, or other data (e.g., system memory 134 in FIG. 5). With the stored persistent states of work items, workflow component 102 is able to maintain a consistency of work items. In other words, workflow component 102 checkpoints regularly the work items and stores the states of the work items at the checkpoints so as to maintain persistent states of all work items.

At 228, workflow component 102 commits the transaction. In other words, workflow component 102 requests service provider components 104 to commit the execution of the batched work items. Referring again to the above example of composing a new web page for a new product, after workflow component 102 assigned all the work need to complete the task, workflow component 102 requests the service provider components to provide a picture of the new product, provide a description of the new product, and the like. It is to be understood that through this assigning, batching and committing of work items, workflow component 102 assists in resolving the disadvantages and shortcomings of a vertically integrated model in which work items are executed/performed upon assignment. By providing this delayed execution, workflow component 102 manages when work items are required for execution/performance while maintaining a consistent state of the work items. At the same time, each of service provider components 104 also has a consistent view of the state of work items other service provider components 104 have in a particular batch or transaction.

By way of example and not limitation, a "Send" message in the messaging service provider component may result in the construction of an object containing ad hoc SQL (structured query language). In this example, the messaging service provider component adds the object, namely, a Work Item, to the work batch. At a scheduled commit point determined by the workflow component, a transaction is created. Moreover, all outstanding assigned work items are given the transaction and the service provider components are instructed to commit to execute/perform the work items. At this point, for example, the messaging service provider component performs whatever actions are appropriate to execute the SQL as part of the transaction. The transaction is then committed.

Figure 3:
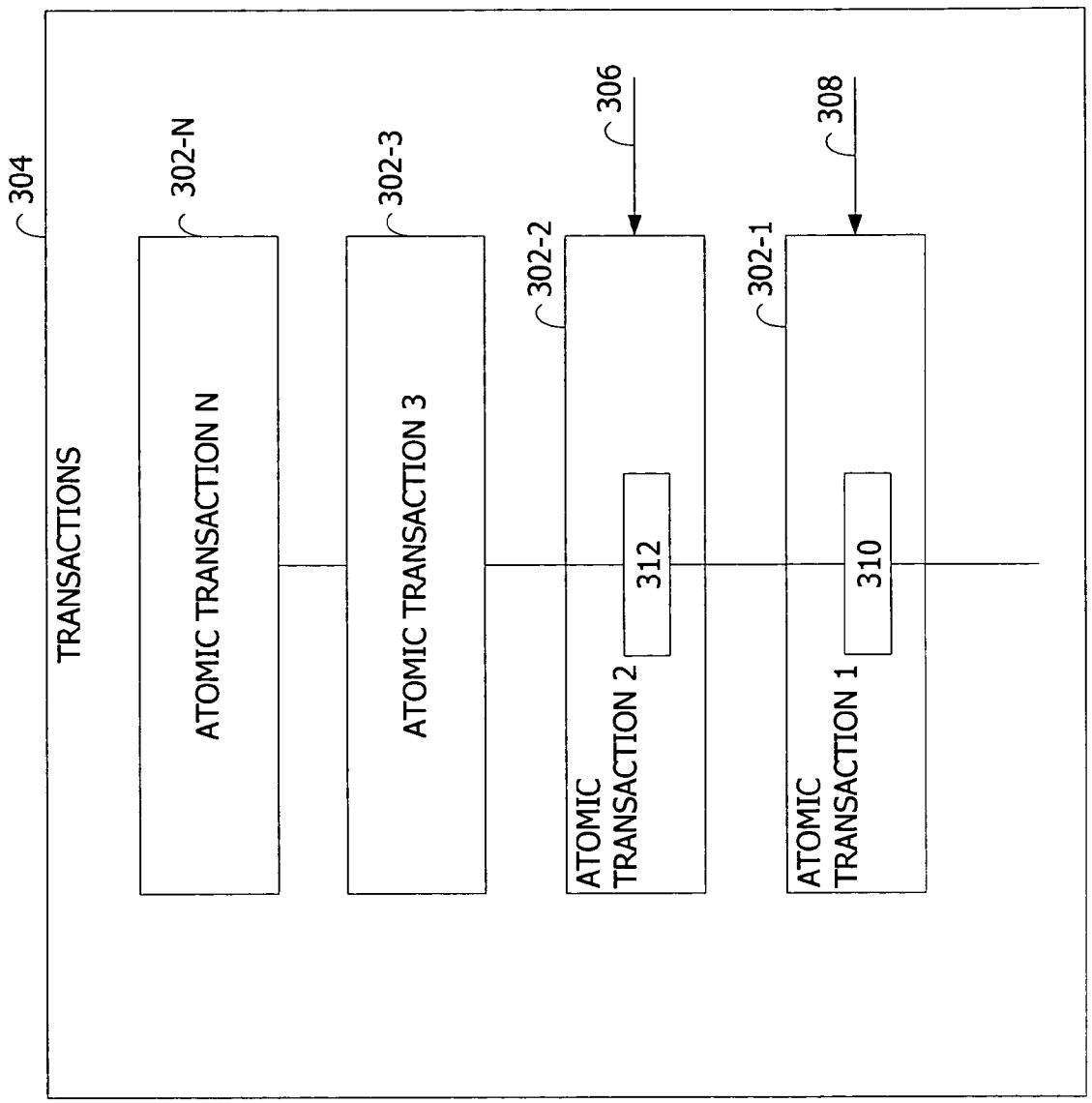
FIG. 3 is an exemplary block diagram illustrating a transaction with one or more appended work items according to an embodiment of the invention.

Referring now to FIG. 3, a block diagram illustrates a transaction 304 with one or more appended work items according to an embodiment of the invention. As discussed, workflow component 102 creates a transaction containing one or more batches of the batched work items. In one embodiment, the transaction 304 is a long running transaction that contains one or more transactions 302 (e.g., 302-1 to 302-N) and takes a substantial long period of time to complete (e.g., several months). In other words, transactions 302 may be batched into another long running transaction, such as the transaction 304. Each of the transactions 302 are organized according to a transaction boundary, as depicted in FIG. 3 showing each transaction 302 in a separate block. For example, the transaction 302-1 (e.g., atomic transaction 1) has a boundary separate from the transaction 302-2 (e.g., atomic transaction 2). By defining the transactions 302 with their separate boundaries, workflow component 102 may checkpoint the transactions 302 to determine the state/status of the transactions 302. For example, workflow component 102 checks or monitors the state of the transaction 302-1 at 308. Similarly, workflow component 102 checks the state of the transaction 302-2 at 306. By checkpointing the state of the transactions 302, workflow component 102 maintains a persistent state of the work items in the transactions 302.

In another example, each transaction 302 includes one or more batches containing one or more work items. For example, atomic transaction 302-1 includes a batch (or a scope batch) 310 including one or more work items (not shown). Similarly, atomic transaction 302-2 includes a batch (or a scope batch) 312 including one or more work items. It is to be understood that while only one batch 301 is shown in atomic transaction 302-1 in FIG. 3, each transaction 302 may contain one or more batches or inner scope batches.

In another embodiment, in the event that one or more work items or the entire transaction is not executed because of fault, workflow component 102 would only need to abandon the work items in the faulted transaction with other transactions unaffected due to the defined transaction boundary. Workflow component 102 first identifies all of the work items related to the faulting scope (e.g., scope batch 310 in atomic transaction 302-1) and constructs a fault work batch. Workflow component 102 then invokes the "complete" state of each unique pending work item with completed status set to "false" for all work in the fault work batch. Moreover, workflow component 102 abandons all work in this work batch. The runtime in this embodiment maintains reference to all remaining work batch items after recovery from the fault. The work may then be committed at a future persistence point.

In the foregoing example of composing a new web page, suppose service provider component 104-1 is unable to provide a picture of the new product after committing to execute the work item in the transaction. In maintaining the persistent state of the transaction, workflow component 102 determines that the particular work item (e.g., providing a picture of the new product) is abandoned or incomplete. The workflow component 102 next abandons part or all the work items in this transaction (i.e. composing a new web page) while other transactions (e.g., taking orders for other items, or the like) are unaffected by this faulted transaction. In one embodiment, upon completing the other work items in other transactions or upon recovery from the fault, workflow component 102 may maintain reference (e.g., the batched work items, the work item definitions, or the like) of the faulted transaction so that workflow component 102 may request service provider components 104 to commit to the work item again at a later time.

In yet another embodiment, service provider component 104-1 may notify or send a message to workflow component 102 indicating that it is unable to complete execution of the committed work item. As a result, workflow component 102 may abandon the work item in response to the received message.

Figure 4:
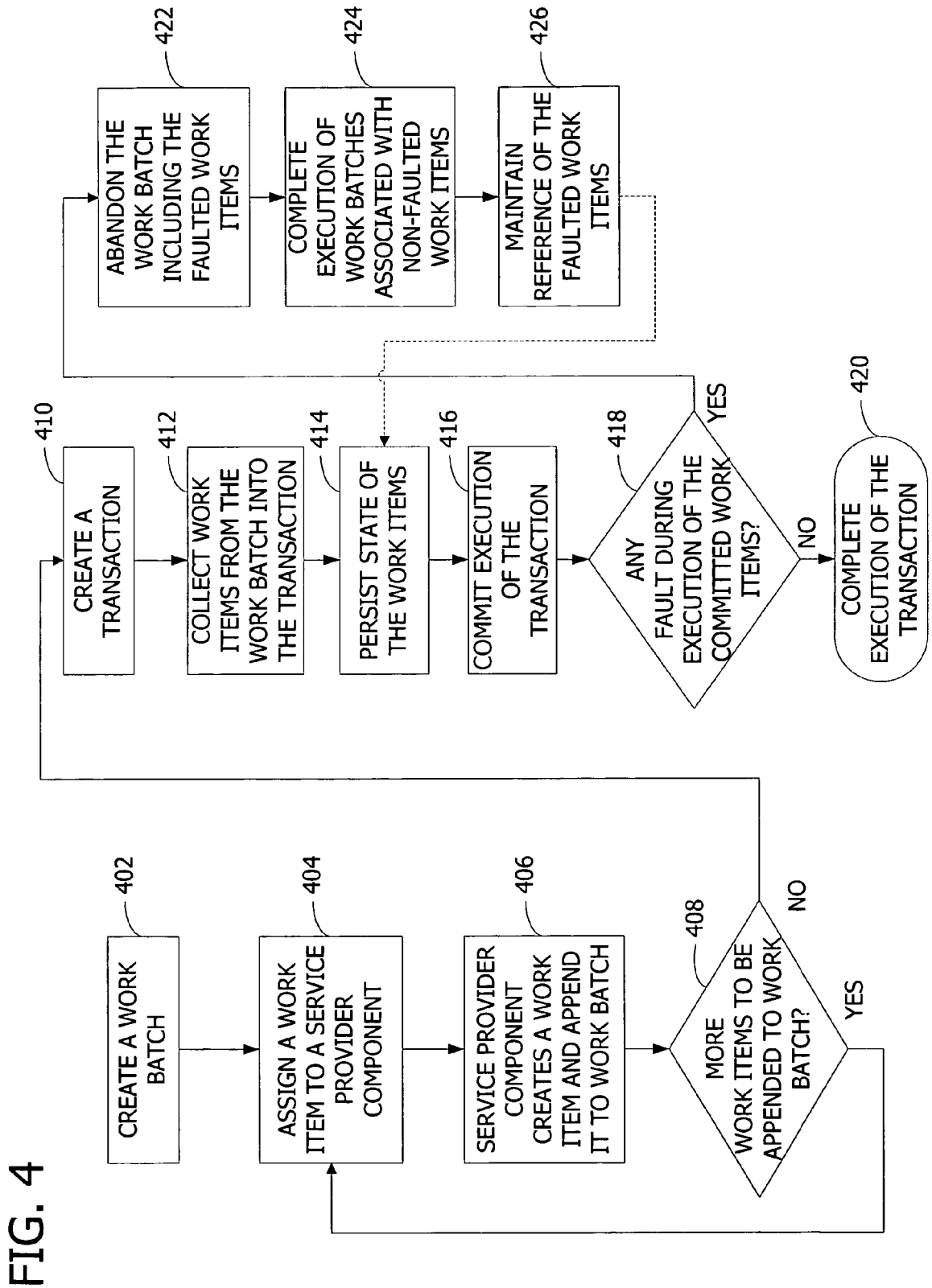
FIG. 4 is an exemplary flow chart illustrating an operation of maintaining consistency of persisted state across communicating components via batching of uncommitted work according to an embodiment of the invention.

FIG. 4 is an exemplary flow chart illustrating an operation of maintaining consistency of persisted state across communicating components via batching of uncommitted work according to an embodiment of the invention. Initially, workflow component 102 defines a workflow containing a set of work items to be performed/executed. At 402, workflow component 102 creates a work batch. Workflow component 102 assigns a work item to a service provider component (e.g., service provider component 104-1) at 404. For example, workflow component 102 assigns work items (e.g., providing a picture of a new product) to service provider components 104. At 406, service provider component 104 creates a work item, as assigned, and appends it to the work batch. The workflow component 102 determines whether there are more work items to be appended to the work batch to complete the workflow at 408. If the determination is positive, workflow component 102 continues to 404 to collect additional work items to be appended to the work batch.

If the determination is negative, workflow component 102 creates a transaction at 410. Alternatively, workflow component 102 may create a transaction at a scheduled time or point. At 412, workflow component 102 collects the batched work items to the transaction. At 414, workflow component 102 persists the state of the work items. The workflow component 102 next commits to the execution of the transaction at 416. That is, workflow component 102 requests service provider components 104 to execute/perform the assigned work. It is to be understood that after service provider components 104 commit to the execution of work items, workflow component 102 continues to persist the state of the work items by storing the state of the work items in persistent storage 106 of FIG. 1.

At 418, workflow component 102 determines whether there is any fault occurred during the execution of the committed work items by periodically checkpoints the state of the work items/transactions. In another embodiment, service provider components 104 send a message or notify workflow component 102 that a fault has occurred. If workflow component 102 determines that there is no execution fault, workflow component 102 proceeds to complete the execution of the transaction at 420.

Alternatively, if workflow component 102 determines there is an execution fault or, in another embodiment, a service provider component indicates there is an execution fault, workflow component 102 abandons batch(es) that are associated with the faulted work items/transaction at 422. In other words, workflow component 102 abandons all of the items in the inner batch (of the faulted scope) and workflow component 102 maintains the work items in the surrounding scopes for a later commit point in this embodiment. At 424, workflow component 102 completes the execution of the non-faulted work items. The workflow component 102 maintains reference of the work associated with the faulted work items at 426, and may continue to have service provider components 104 to commit the faulted work items at a later time (as shown by the dashed lines). Appendix A provides an exemplary protocol for workflow transactional batching.

The present invention provides advantages over conventional workflow system design and modeling by implementing a batch containing work items that embodies at least some of the features of the invention. In operation, a software system containing one or more components or software systems comprises a workflow component that manages the workflows. The workflow component initially defines a workflow (e.g., composing a new web page for a new product) to be performed by one or more service provider components. For example, the workflow for composing a new web page may include work items such as providing a picture of the new product, providing a description of the new product, determining the new product availability, and the like. It is to be understood that the service provider components may be in a separate software system, application, or package from the workflow component.

The workflow component creates a work batch and sends a message assigning the work items to the service provider components. The service provider components determine whether the assigned work items may be executed/performed. If the determination is positive, the service provider components append the work item in the work batch. It is to be understood that by this batching process, the workflow component delays a substantially simultaneous execution of the assigned work items.

The workflow component next creates a transaction containing the batched work items. The workflow component periodically persists the state of the work items by checkpoint the transaction/work items and stores the state of the work items in the persistent storage. In so doing, the workflow component maintains a consistency of the persisted state of the work items in various transactions. The workflow component commits the transaction by requesting the service provider components to execute/perform the work items.

In the event that an execution fault occurs, the workflow component abandons the faulted work items. The workflow component continues to complete the execution of non-faulted work items. In one embodiment, the service provider components send a message to the workflow component indicating an execution fault has occurred. Upon recovery from the faulted execution or after completing execution of the non-faulted work items, the workflow component may commit the faulted work items at a later time.

Figure 5:
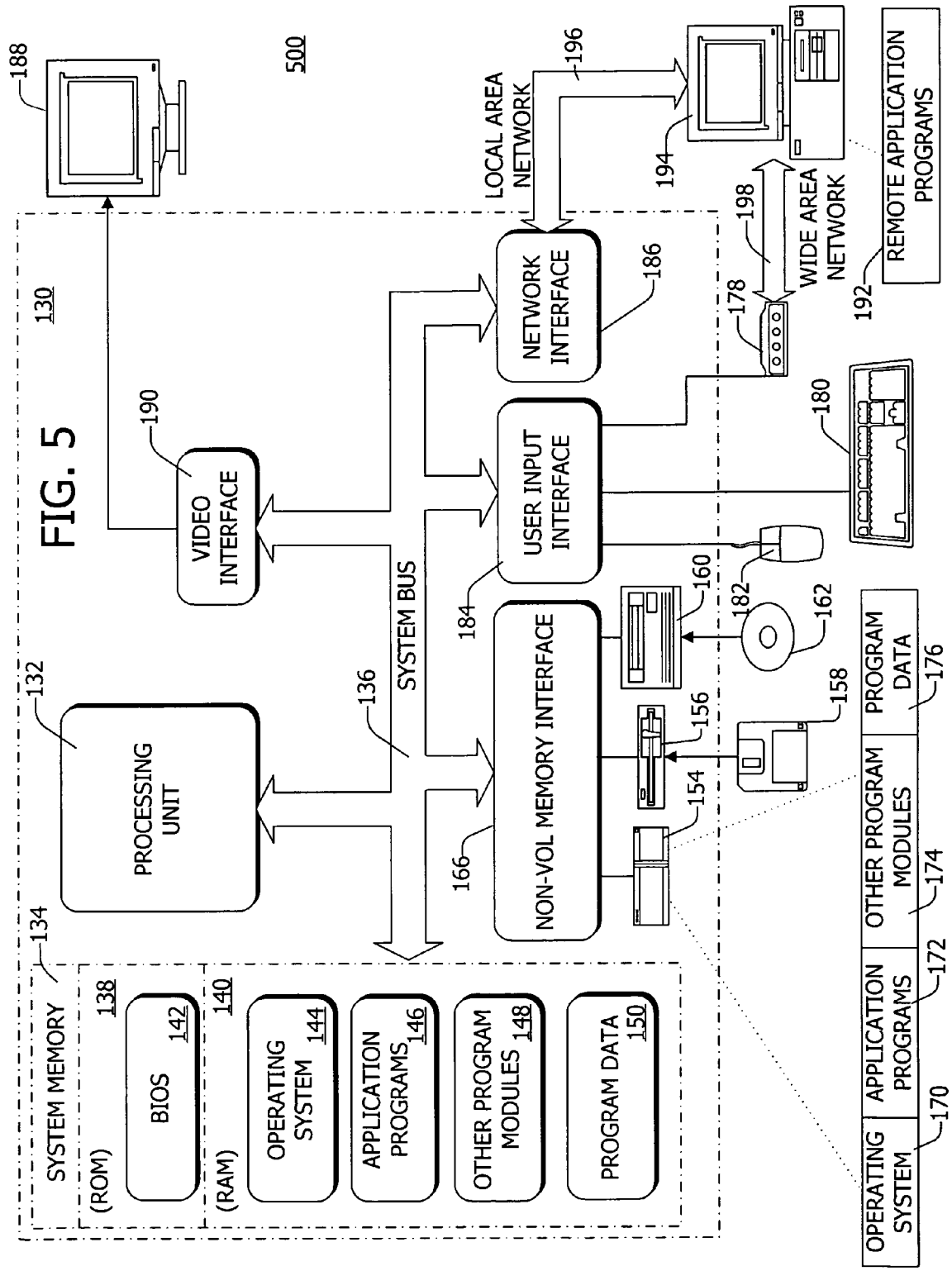
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

APPENDIX A

Workflow Transactional Batching

During execution of an exemplary workflow, runtime calls into its services to do work. For example, a send workflow activity is a call to a messaging service. The messaging service processes the send request and maintains certain state associated with the send. One of the requirements of the transaction/persistence model is to maintain consistency between states maintained by the different services and workflow runtime. When the workflow reaches a commit point, the runtime invokes the persistence service and hands out its workflow instance state. This instance state and other services work may be batched and committed to durable resource managers (RMs) enlisted in one single transaction.

If $B_0$ and $B_1$ are separate batches of work (e.g., see transaction 304 and atomic transaction 302-N in FIG. 3), at commit point the entire work collection $\{B_0, B_1\}$ needs to be committed in transaction. On failure of the transaction, the requirement is, the work associated with $B_0$ should be thrown away. The work associated with $B_1$ should continue to exist for the subsequent point.

According to an embodiment of the invention, in order to facilitate providers sharing in the same transaction, the Runtime floats a WorkBatch object in its thread call context in all calls to its Services. Services can choose to add work to this batch. For example, a Send method in the messaging service may result in the construction of an object containing ad hoc SQL. The messaging service can then add the object to the WorkBatch. At the schedule's commit point, the messaging service IPendingWork.Complete method is invoked and all of its pending work is handed back to it. The service can then perform whatever actions are appropriate to execute the SQL as part of the transaction.

For example, Namespace:Microsoft.Workflow.Runtime:

```
public sealed class WorkBatch
{
    public void Add(IPendingWork work, object workItem);
}
```

An Add method may be used to add pending work items to a work batch. The provider tags work added to the batch with a reference to an object that implements the IPendingWork interface. This object will handle the eventual commit of the work. In the example below, the persistence provider itself implements the IPendingWork interface.

The interface IPendingWork is defined as:

```
interface IPendingWork
{
    void Commit(ITransaction transaction,IList<object> items);
    void Complete(bool succeeded, IList<object> items);
}
```

In a Commit method, the list of work items are committed to the database using the transaction object.

A Complete method performs necessary cleanup. This method is called by the runtime when it is finished processing the work in the item list. If the work was successfully completed then succeeded=true, otherwise succeeded=false.

Further to this example, the sequence of actions at Commit Point include:

a. The runtime invokes PersistenceService::Save method.

b. The runtime invokes TransactionService::Create method and gets System.ICommitableTransaction c. The runtime iterates over its work collection and collects all items that reference the same IPendingWork object. It then invokes the Commit method of each unique IPendingWork object one time, passing the Transaction and a list of all of its outstanding work.

d. On success of the Commit notifications, the runtime invokes ICommittableTransaction::Commit e. On success of the transaction the runtime invokes the Complete method of each unique IPendingWork object one time, passing succeeded=true and a list of all of its outstanding work.

An exemplary sequence of actions on Workflow Fault includes:

a. The runtime, based on workflow model semantics (atomic scopes), decides to abandon IPendingWork objects related to the faulting scope.

b. The runtime invokes the Complete method of each unique IPendingWork with completed status=false for all abandoned work.

c. The runtime maintains reference to any work that its semantics tell it is still valid after recovery from the fault. That work may then be committed at a future persistence point.

What is claimed is:

1. A method for managing state in a workflow, said method comprising:

defining one or more work items to be executed;

defining an execution sequence fro the one or more defined work items;

assigning said one or more defined work items to one or more service provider components for execution without requiring the one or more service provider components to immediately execute the assigned work items upon the work items being assigned to the one or more service provider components;

batching said one or more assigned work items to said one or more service components in a batch for delayed execution by the one or more service provider components at as later time, said batch including an execution state of each of the one or more assigned work items yet to be executed by the one or more service provider components;

persisting the execution state of said one or more batched work items, said persisting further comprising:

monitoring the execution state of batched work items in the batch as the work items are executed according to the defined execution sequence, and saving the state of said one or more batched work items in a computer storage medium, wherein the state of said one or more assigned work items includes at least one of the following: completed, executing, and abandoned; and committing the one or more service provider components to execute the one or more batched work items according to the defined execution sequence, wherein said one or more service provider components execute the one or more committed work items.

2. The method of claim 1, wherein committing comprises at least one of the following: creating a transaction; and appending the one or more batched work items to a transaction.

3. The method of claim 2 wherein appending comprises segmenting the one or more appended work items in the transaction as a function of the one or more defined work items.

4. The method of claim 1,
wherein the one or more service provider components are part of one or more of the following: one or more host environments and one or more host environments that are remote with respect to said one or more defined work items, and
wherein the one or more work items include at least one or more of the following:
messaging, instance, transaction, persistence, threading, timer, roles, and tracking.

5. The method of claim 1 further comprising sending a message by the one or more service provider components upon failure to execute the one or more committed work items.

6. One or more computer storage media having computer-executable components stored thereon for managing state in a workflow, said components comprising:
a workflow component for assigning one or more work items to be executed without requiring one or more service provider components to immediately execute the assigned work items upon the work items being assigned to the one or more service provider components, wherein said workflow component defines the one or more work items and defines an execution sequence for the one or more defined work items, wherein said workflow component batches one or more of the assigned work items in a batch for delayed execution by the one or more service provider components at a later time;
a memory for storing a persistent state of the one or more batched work items, wherein said persistent state of the one or more batched work items includes at least one of the following: completed, executing, and abandoned; and
the one or more service provider components for committing to execute the one or more batched work items according to the defined execution sequence.

7. The computer storage media of claim 6 wherein the workflow component creates a transaction, said transaction includes the one or more batched work items.

8. The computer storage media of claim 6 wherein the workflow component further comprising segmenting the one or more assigned work items in the transaction as a function of the one or more defined work items.

9. The computer storage media of claim 6 wherein the one or more service provider components are part of one or more host environments.

10. The computer storage media of claim 6 wherein the workflow component assigns said one or more defined work items to one or more service provider components for execution, said one or more service provider components are part of one or more host environments that are remote with respect to said one or more defined work items.

11. The computer storage media of claim 6 wherein the one or more service provider components notify the workflow component upon failure to execute the one or more committed work items.

12. A method for managing workflow of one or more work items executable by a first host environment, said method comprising:
receiving, at the first host environment, an assignment to execute one or more work items, wherein the assignment does not require the first host environment to execute the assigned work items when the assignment is received, said assignment further defining an execution sequence for the one or more work items;
appending the one or more assigned work items to a batch, wherein appending indicates said one or more assigned work items in the batch to delay execution by the first host environment until a later time;
receiving, at the first host environment, a request to execute the one or more assigned work items;
saving state of the one or more batched work items in a computer storage medium, wherein the state of the of the one or more batched work items includes at least one of the following: completed, executing, and abandoned; and
executing, at the first host environment, the one or more requested work items, wherein the execution sate of the one or more executed work items is referenced from the batch according to the defined execution sequence.

13. The method of claim 12 further comprising appending the batch to a transaction.

14. The method of claim 13,
wherein the transaction comprises defining an atomic transaction boundary for the one or more work items in the transaction as a function of the one or more defined work items, and
wherein the one or more work items are executable in a second host environment.

15. The method of claim 13 further comprising saving the state of the one or more batched work items in the transaction according to the defined atomic transaction boundary of the one or more work items.

16. The method of claim 12 further comprising sending a message by the first host environment upon failure to execute the one or more committed work items.

* * * * *

UNITED STATES PATENT AND TRADEMARK OFFICE
CERTIFICATE OF CORRECTION

| | |
|---|---|
| PATENT NO. | : 7,665,093 B2 |
| APPLICATION NO. | : 11/023769 |
| DATED | : February 16, 2010 |
| INVENTOR(S) | : Maybee et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1435 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,665,093 B2 | Page 1 of 1 |
| APPLICATION NO. | : 11/023769 | |
| DATED | : February 16, 2010 | |
| INVENTOR(S) | : Paul E. Maybee et al. | |

It is certified that error appears in the above-identified patent and that said Letters Patent is hereby corrected as shown below:

Column 10, line 41, after "FIG." insert -- 5 --.

Column 14, line 48, in Claim 1, delete "fro" and insert -- for --, therefor.

Column 14, line 57, in Claim 1, after "service" insert -- provider --.

Column 14, line 59, in Claim 1, delete "as" and insert -- a --, therefor.

Column 16, line 34, in Claim 12, after "of the" delete "of the".

Column 16, line 39, in Claim 12, delete "sate" and insert -- state --, therefor.

Signed and Sealed this
Eighth Day of February, 2011

David J. Kappos
*Director of the United States Patent and Trademark Office*